Patented Nov. 19, 1940

2,221,809

UNITED STATES PATENT OFFICE 2,221,809

CYCLOHEXYL-HALO-PHENOLS

Lindley E. Mills, Midland, Mich., assignor to The Dow Chemical Company, Midland, Mich., a corporation of Michigan No Drawing. Application February 12, 1937, Serial No. 125,436

5 Claims. (Cl. 260—619)

The present invention regards a new class of compounds, namely, the cyclohexyl-halo-phenols.

I have prepared the aforementioned compounds and determined certain physical properties thereof whereby they may be readily identified. The invention, then, consists of the new products hereinafter fully described and particularly pointed out in the claims, the following description setting forth in detail several of the various ways in which the principle of the invention may be realized.

The cyclohexyl-halo-phenols included within the scope of my invention have the following general structural formula; wherein one symbol X represents the cyclohexyl group, another symbol X represents a halogen and the third symbol X may represent either hydrogen or a halogen.

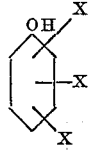

The preparation of my new compounds may be accomplished by treating cyclohexyl-phenol directly with a halogen. For example, the cyclohexyl-phenol may be placed in a reactor provided with an agitator, and the halogen added thereto at a suitable rate over a period of time. The temperature of the reaction mixture is preferably to be so regulated that it is maintained liquid throughout the entire reaction, usually between about 20° and about 150° C. The halogen may be added to the reaction mixture in any convenient manner, for instance, if the halogen is chlorine it may be bubbled through the liquid reaction mixture, while in the case of bromine it can be dropped upon the surface, or introduced below the surface, of the mixture.

After the desired amount of halogen has been introduced into the reactor the reaction mixture is blown with air to insure removal of any small amounts of hydrogen halide remaining therein. The cyclohexyl-halo-phenol can then be separated from the reaction product by fractional distillation, preferably in vacuo; or the product may simply be allowed to cool if the compound produced will crystallize from the solution. A solvent which does not halogenate under the reaction conditions may advantageously be used in carrying out the halogenation, particularly when chlorine is the halogen. When the halo-phenol produced is a solid at room temperatures the use of a solvent permits the halogenation to be effected at a low temperature. This in turn benefits the yield of halo-phenol since at the lower temperatures there is less formation of tar and other undesirable products, such as higher halogenated phenols. In preparing cyclohexyl-chlorophenols, I have found suitable solvents to be ethylene chloride, carbon tetrachloride, monochlorobenzene, tetrachloro-ethylene and benzene.

The chloro-bromo-cyclohexyl-phenols are prepared in one of the following ways: (a) by controlled chlorination of a dibromo-cyclohexyl-phenol under conditions such that one of the bromine atoms is replaced by a chlorine atom; or (b) by direct bromination of a mono-chloro-cyclohexyl-phenol.

The physical properties of the various members of my new class of compounds vary over a considerable range. The properties of certain of the compounds are set forth in the tabular form after the following example which describes in detail the method used in preparing one specific compound.

Example

In a reactor provided with an agitator was placed 176 grams of 4-cyclohexyl-phenol. The phenol was melted by heating to a temperature of about 130° C., and 160 grams of bromine was introduced slowly below the surface of the molten compound. The reaction mixture was heated to maintain it liquid throughout the bromination. After the reaction was completed the product was blown with air to remove a slight amount of hydrogen bromide remaining therein, and then fractionated in vacuo. The first fraction, distilling over up to 163° C. at 10 millimeters absolute mercury pressure, amounted to 9.5 grams. The second fraction of 111.0 grams, boiling between 163° and 168° C. at the same pressure, was substantially pure 4-cyclohexyl-2-bromo-phenol. The third fraction, distilling above 168° C., amounted to 65.5 grams and was found to contain considerable quantities of 4-cyclohexyl-2,6- dibromo-phenol. The middle fraction of 4-cyclohexyl-2-bromo-phenol was refractionated at 3 millimeters absolute mercury pressure and pure 4-cyclohexyl-2-bromo-phenol boiling at 130°–132° C. under 3 millimeters absolute pressure was obtained. The compound is a colorless viscous liquid having a specific gravity of 1.356 compared to water at 15° C.

The following table shows the properties of certain other cyclohexyl-halo-phenols which I have prepared.

| New compound | Properties | | |
|---|---|---|---|
| | Specific gravity | Boiling point | Freezing point |
| 4-cyclohexyl-2.6-dibromo-phenol | 1.667 at 15/15° C | 178° C. at 3 mm | |
| 4-cyclohexyl-2-chloro-phenol | 1.160 at 15/15° C | 134.5° C. at 2 mm | |
| 4-cyclohexyl-2.6-dichloro-phenol | | 165° C. at 2 mm | 53° C. |
| 6-cyclohexyl-monochloro-phenol | 1.148 at 25/25° C | 152–160° C. at 9 mm | |
| 6-cyclohexyl-2-chloro-phenol | | 165–167° C. at 24 mm | 40.3–40.8°C. |
| 6-cyclohexyl-4-chloro-phenol | | 173° C. at 13 mm | 59.4–60.2° C. |
| 6-cyclohexyl-2.4-dichloro-phenol | | 180–185° C. at 4 mm | 56° C. |
| 6-cyclohexyl-monobromo-phenol | 1.365 at 15/15° C | 175–185° C. at 8 mm | |
| 3-cyclohexyl-dibromo-phenol | | | 80–80.5° C. |
| 3-chloro-mono-cyclohexyl-phenol | | 190° C. at 20 mm | Oil. |
| 3-chloro-mono-cyclohexyl-phenol | | 191.5–193° C. at 20 mm | 49.1–50.1° C. |
| 3-chloro-mono-cyclohexyl-phenol | | 178–180° C. at 20 mm | 48.1–49.6° C. |

I have found that the compounds included within the scope of my invention may advantageously be used in the preparation of antiseptic solutions. For instance, the toxicity coefficient of 2-cyclohexyl-4-chloro-phenol is 96, compared to a value of 100 for phenol, as determined by the method of Worth and Hale, United States Public Health Service, Hygienic Laboratory, Bulletin No. 88 (1915). Cyclohexyl-monochloro-phenol has a phenol coefficient of 33 against *E. typhi,* compared to a value of 1 for phenol, as determined by the method developed by the United States Public Health Service, Hygienic Laboratory, Circular No. 198 of the Food and Drug Administration, United States Department of Agriculture. The 4-cyclohexyl-2-bromo-phenol has a phenol coefficient of 5.5.

The following compounds are specifically included in the scope of my invention: 2-cyclohexyl-3-chloro-phenol, 2-cyclohexyl-4-chloro-phenol, 2-cyclohexyl-5-chloro-phenol, 2-cyclohexyl-6-chloro-phenol, 3-cyclohexyl-2-chloro-phenol, 3-cyclohexyl-4-chloro-phenol, 3-cyclohexyl-5-chloro-phenol, 3-cyclohexyl-6-chloro-phenol, 4-cyclohexyl-2-chloro-phenol, 4-cyclohexyl-3-chloro-phenol, 2-cyclohexyl-3-bromo-phenol, 2-cyclohexyl-4-bromo-phenol, 2-cyclohexyl-5-bromo-phenol, 2-cyclohexyl-6-bromo-phenol, 3-cyclohexyl-2-bromo-phenol, 3-cyclohexyl-4-bromo-phenol, 3-cyclohexyl-5-bromo-phenol, 3-cyclohexyl-6-bromo-phenol, 4-cyclohexyl-2-bromo-phenol, 4-cyclohexyl-3-bromo-phenol, 2-cyclohexyl-3.4-dichloro-phenol, 2-cyclohexyl-3.5-dichloro-phenol, 2-cyclohexyl-3.6-dichloro-phenol, 2-cyclohexyl-4.5-dichloro-phenol, 2-cyclohexyl-4.6-dichloro-phenol, 2-cyclohexyl-5.6-dichloro-phenol, 3-cyclohexyl-2.4-dichloro-phenol, 3-cyclohexyl-2.5-dichloro-phenol, 3-cyclohexyl-2.6-dichloro-phenol, 3-cyclohexyl-4.5-dichloro-phenol, 3-cyclohexyl-4.6-dichloro-phenol, 3-cyclohexyl-5.6-dichloro-phenol, 4-cyclohexyl-2.3-dichloro-phenol, 4-cyclohexyl-2.5-dichloro-phenol, 4-cyclohexyl-2.6-dichloro-phenol, 4-cyclohexyl-3.5-dichloro-phenol, 2-cyclohexyl-3.4-dibromo-phenol, 2-cyclohexyl-3.5-dibromo-phenol, 2-cyclohexyl-3.6-dibromo-phenol, 2-cyclohexyl-4.5-dibromo-phenol, 2-cyclohexyl-4.6-dibromo-phenol, 2-cyclohexyl-5.6-dibromo-phenol, 3-cyclohexyl-2.4-dibromo-phenol, 3-cyclohexyl-2.5-dibromo-phenol, 3-cyclohexyl-2.6-dibromo-phenol, 3-cyclohexyl-4.5-dibromo-phenol, 3-cyclohexyl-4.6-dibromo-phenol, 3-cyclohexyl-5.6-dibromo-phenol, 4-cyclohexyl-2.3-dibromo-phenol, 4-cyclohexyl-2.5-dibromo-phenol, 4-cyclohexyl-2.6-dibromo-phenol, 4-cyclohexyl-3.5-dibromo-phenol, 2-cyclohexyl-3-chloro-4-bromo-phenol, 2-cyclohexyl-3-chloro-5-bromo-phenol, 2-cyclohexyl-3-chloro-6-bromo-phenol, 2-cyclohexyl-4-chloro-3-bromo-phenol, 2-cyclohexyl-4-chloro-5-bromo-phenol, 2-cyclohexyl-4-chloro-6-bromo-phenol, 2-cyclohexyl-5-chloro-3-bromo-phenol, 2-cyclohexyl-5-chloro-4-bromo-phenol, 2-cyclohexyl-5-chloro-6-bromo-phenol, 2-cyclohexyl-6-chloro-3-bromo-phenol, 2-cyclohexyl-6-chloro-4-bromo-phenol, 2-cyclohexyl-6-chloro-5-bromo-phenol, 3-cyclohexyl-2-chloro-4-bromo-phenol, 3-cyclohexyl-2-chloro-5-bromo-phenol, 3-cyclohexyl-2-chloro-6-bromo-phenol, 3-cyclohexyl-4-chloro-2-bromo-phenol, 3-cyclohexyl-4-chloro-5-bromo-phenol, 3-cyclohexyl-4-chloro-6-bromo-phenol, 3-cyclohexyl-5-chloro-2-bromo-phenol, 3-cyclohexyl-5-chloro-4-bromo-phenol, 3-cyclohexyl-5-chloro-6-bromo-phenol, 3-cyclohexyl-6-chloro-2-bromo-phenol, 3-cyclohexyl-6-chloro-4-bromo-phenol, 3-cyclohexyl-6-chloro-5-bromo-phenol, 4-cyclohexyl-2-chloro-3-bromo-phenol, 4-cyclohexyl-2-chloro-5-bromo-phenol, 4-cyclohexyl-2-chloro-6-bromo-phenol, 4-cyclohexyl-3-chloro-2-bromo-phenol, 4-cyclohexyl-3-chloro-5-bromo-phenol, 4-cyclohexyl-3-chloro-6-bromo-phenol.

This application is a continuation-in-part of my prior filed co-pending application Serial No. 655,086, filed February 3, 1933.

Other modes of applying the principle of my invention may be employed instead of the one explained, change being made as regards the materials employed, provided the products claimed in the following claims be thereby obtained.

I therefore particularly point out and distinctly claim as my invention:

1. A compound having the general structural formula:

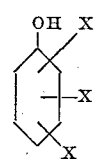

wherein one symbol X represents the cyclohexyl group, another symbol X represents a halogen, and the third symbol X represents a material selected from the group consisting of hydrogen and halogen.

2. A compound having the general structural formula:
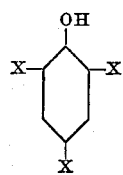
wherein one symbol X represents the cyclohexyl group, another symbol X represents a halogen, and the third symbol X represents a material selected from the group consisting of hydrogen and halogen.
3. 4-cyclohexyl-2-bromo-phenol.
4. 2-cyclohexyl-4-chloro-phenol.
5. 4-cyclohexyl-2-chloro-phenol.
LINDLEY E. MILLS.